United States Patent [19]

Klein et al.

[11] Patent Number: 4,521,121
[45] Date of Patent: Jun. 4, 1985

[54] AIR BEARING

[75] Inventors: Gregory L. Klein, York; C. Leonard Burton, Clover, both of S.C.

[73] Assignee: Textron Inc., Providence, R.I.

[21] Appl. No.: 521,035

[22] Filed: Aug. 8, 1983

[51] Int. Cl.³ .................. F16C 32/06; F16C 33/10; F15D 1/08
[52] U.S. Cl. .................. 384/100; 138/44; 384/114; 384/118
[58] Field of Search ............ 384/100, 119, 120, 114, 384/118, 286–293, 322, 388, 392, 399; 308/5 R; 138/44; 137/565; 251/118; 239/533.14

[56] References Cited

U.S. PATENT DOCUMENTS

| 3,018,799 | 1/1962 | Volkmann et al. | 138/44 X |
| 3,517,700 | 6/1970 | Williams et al. | 138/44 |
| 3,671,049 | 6/1972 | Stamm | 384/100 X |
| 4,103,978 | 8/1978 | Hoornstra | 384/100 |

Primary Examiner—Stuart S. Levy
Assistant Examiner—Thomas R. Hannon
Attorney, Agent, or Firm—Anthony P. DeLio

[57] ABSTRACT

An improved air metering nozzle assembly for air bearings wherein the metering orifice is formed in a flat disc separate from air supply elements and is readily removable and replaceable.

5 Claims, 7 Drawing Figures

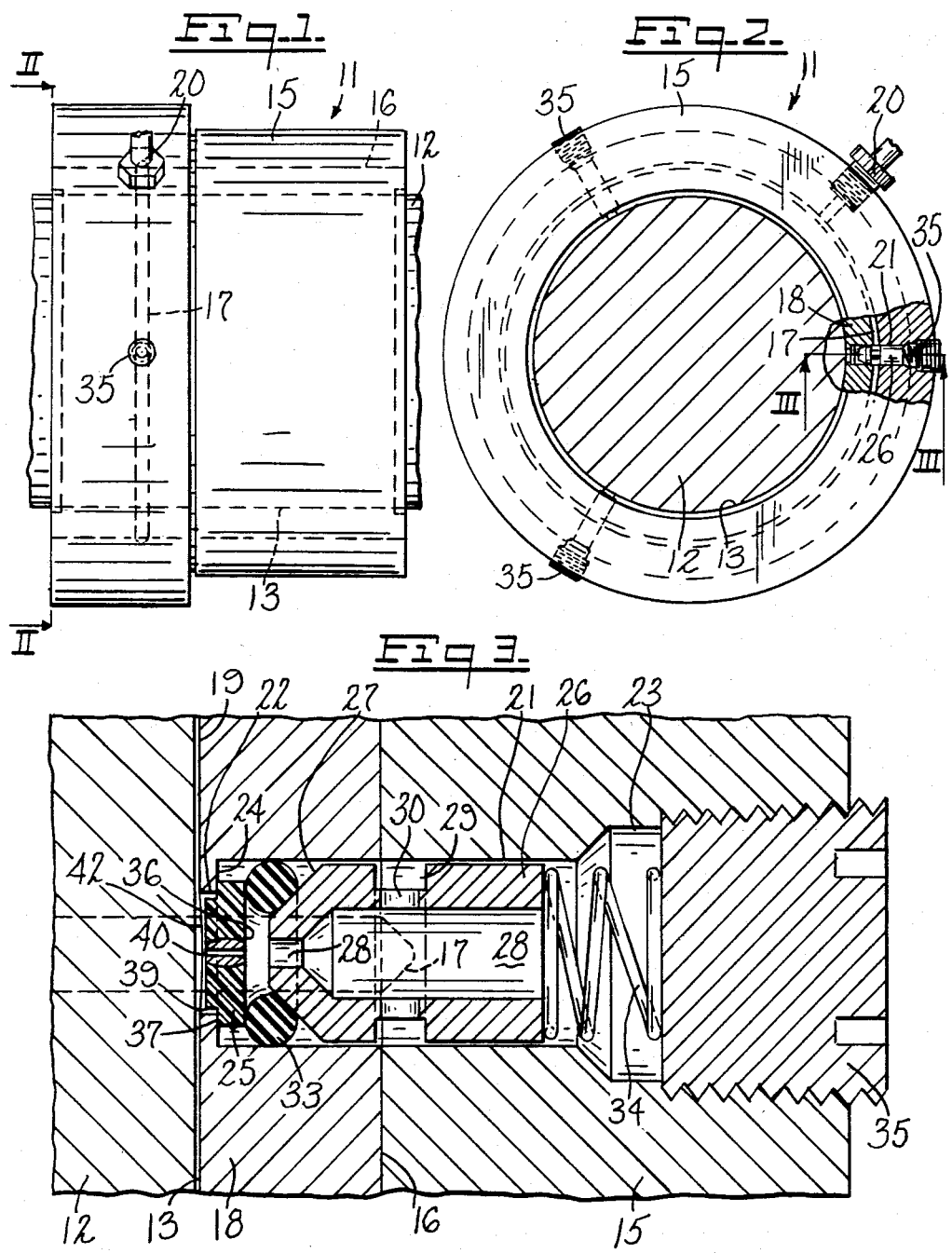

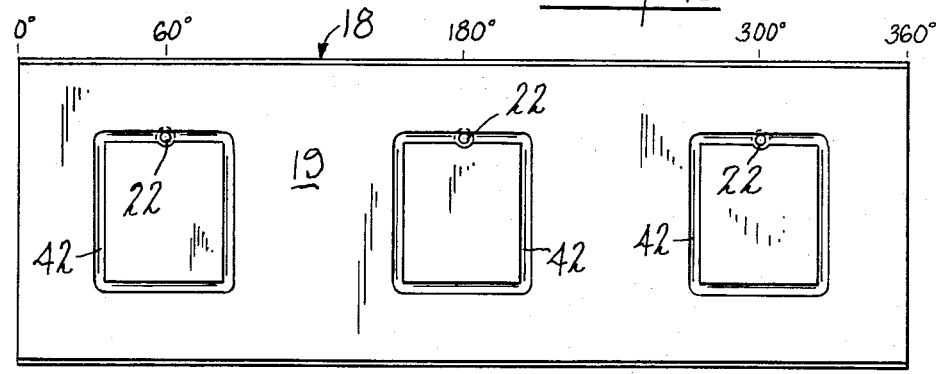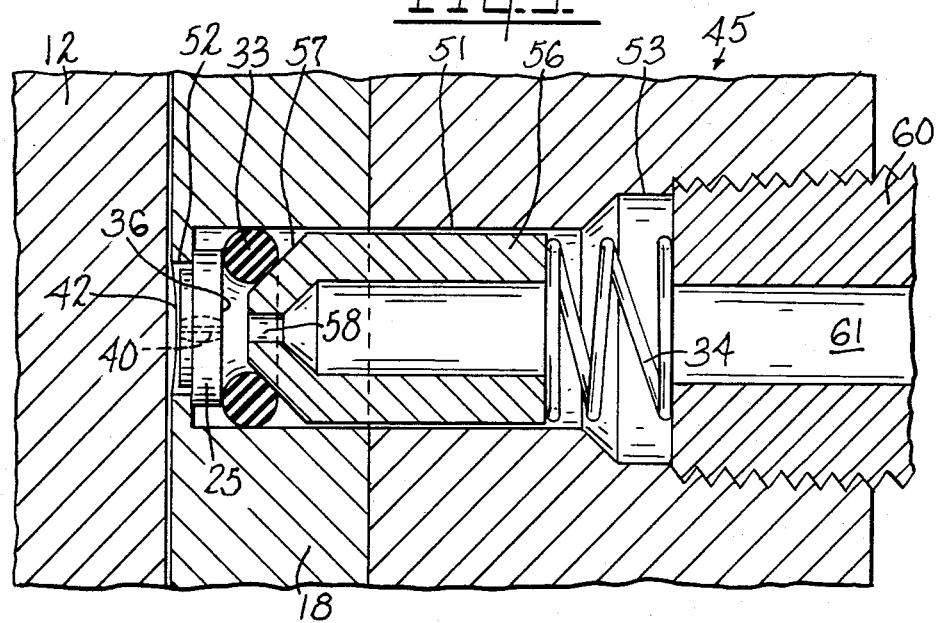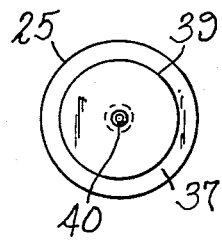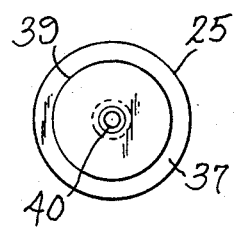

ions where the speed of movement of one mechanical
AIR BEARING

This invention relates to an air bearing for supporting heavy rapidly rotating or reciprocating metal shafts or sliding trays in a machine frame, housing, or the like without metal-to-metal contact.

BACKGROUND OF THE INVENTION

Air bearing systems are particularly useful in situations where the speed of movement of one mechanical element relative to an adjacent element is so high that normal liquid or solid lubricants can no longer minimize and dissipate the heat of friction to a satisfactory degree. Air bearings have many advantages over other fluid lubricants in that they run cool with no need for a warming up period, have low or negligable frictional torque and need not be supplemented by a supply of liquid lubricant.

The efficacy of an air bearing is a function of the pressure (velocity) of the air and adequacy of its distribution across the surfaces to be separated. Air is normally supplied under high pressure through suitable conduits to one or more nozzles in a relatively stationary first element of a machine and each nozzle feeds air at a known rate to a depression or pocket in a surface of said first element which faces and is adjacent to a surface of a relatively movable second element of the machine. The film of air between the facing surfaces of the respective elements represents the bearing and it supports the load imposed by the second element, whether the relative movement is rotational or sliding.

The air supply nozzles may be formed by apertures in floating pads, with a slight freedom of movement in response to varying operating conditions, or they may be fixed in the stationary first machine element. The present invention relates to a nozzle of the fixed type.

THE INVENTION

The specific improvement disclosed herein relates to the provision of a plate with a metering orifice and means for mounting the plate in an air supply nozzle so that it can be readily removed and replaced.

OBJECTS OF THE INVENTION

It is an object of the present invention to provide an air bearing wherein the nozzle comprise plates which have been manufactured to the proper orifice size, such plates being commercially available for other purposes.

It is another object of the invention to provide orifice plates which are readily interchangeable to meet changing conditions for the air bearing.

It is further object of the invention to utilize a nozzle element which is relatively easy to handle, for installation, inspection, removal and replacement.

It is yet another object of the invention to provide certain improvement in the form, construction, arrangement and materials of the several parts whereby the above-named and other objects may effectively be attained.

A practical embodiment of the invention is shown in the accompanying drawings wherein:

FIG. 1 represents a detail side elevation of an air bearing for a rotating shaft;

FIG. 2 represents a cross-sectional view on the lines II—II of FIG. 1, parts being cut away and shown in section;

FIG. 3 represents an axial sectional view, on an enlarged scale, of the air bearing inlet fitting, taken on the line III—III of FIG. 2;

FIG. 4 represents a flat projection of the cylindrical bearing surface of the air bearing shown in FIGS. 1 and 2;

FIG. 5 represents an axial sectional view, on an enlarged scale, of a modified form of inlet fitting; and FIGS. 6 and 7 represent elevational views of nozzle plates, each with a metering orifice shown therein and the orifices being of different diameters.

Referring to the drawings, and particularly to FIGS. 1 to 4, the bearing 11 is designed to receive and support a shaft 12 which extends through the bore 13, the shaft and bearing being relatively movable for any desired purpose. That is, the shaft may be rotated, at any speed, or it may be stationary and serve as a guide (vertical or horizontal) for reciprocating movement of a machinery element which includes the air bearing.

The bearing is shown as comprising a cylindrical housing 15 having a smooth cylindrical inner surface 16 in which is formed an annular groove 17. A cylindrical liner 18 has an outer surface which engages tightly against the inner surface 16 of the housing, constituting the groove 17 as a conduit for distribution of air under pressure which is introduced through the inlet fitting 20 (FIG. 2) mounted in the wall of the housing. The inner surface of the liner 18 is designated 19.

Each air nozzle assembly, three being shown in FIG. 2, is contained in one of the radial bores extending through the housing 15 and liner 18, at 120° intervals, each bore having a cylindrical portion 21 with a first diameter, a small diameter portion 22 at its inner end and a larger diameter portion 23 at its outer end, the portion 23 being threaded. Between the portions 21 and 22 there is a flat annular shoulder 24, against which rests the marginal portion of a metering disc 25. A hollow thimble 26 fits freely in the bore portion 21, the thimble having a beveled nose surface 27 at its radially inward directed end, an axial bore 28 extending through said end, an external annular groove 29 around its mid-portion and radial passages 30 connecting said groove with the thimble interior. An O-ring 33 is located between the marginal rear face of the disc 25 and the beveled surface 27 of the thimble, sealing pressure on the O-ring being maintained by a coil spring 34 compressed between the open end of the thimble and a plug 35 which is screwed into the threaded bore portion 23. The parts are so located and proportioned that the groove 29 registers with the groove 17 when the O-ring is compressed against the plate 25. The conduit for air under pressure thus comprises the fitting 20, groove 17, grooves 29 (in each thimble), passages 30, bores 28 and thence to the metering discs 25.

The metering disc is constituted by a circular plate of nylon and synthelic ruby and is formed with one flat surface 36 and an opposite stepped surface presenting an annular land 37 and cylindrical shoulder 39 having a diameter slightly less than that of the bore portion 22. The disc has an axial orifice 40 having a diameter measured in ten thousandths of an inch. Discs having a standard O.D. (to fit in the bore portion 21) can be made with orifices in a range of sizes to meet varying bearing load and other operating conditions (FIGS. 6 and 7).

For greatest anti-friction efficiency, the air film between the relatively moving machine parts must be distributed as evenly as possible throughout the bearing area. To this end, the element containing the nozzle (e.g. housing 15 with liner 18) has it otherwise smooth cylindrical inner surface 19 provided with one or more shallow, generally rectangular, grooves 42 which, at one point, intersect the portions 22 of the radial bores containing the nozzle assemblies. The grooves 42 extend both circumferentially and axially across the intermediate portions of the bearing surface and are repeated in connection with each inlet nozzle. Thus each of the three nozzles shown in FIG. 2 is associated with a rectangular groove as shown in the projection, FIG. 4.

While FIG. 4 is presented as representing a flattened cylindrical surrace, with reference to FIG. 2, it may also be regarded as a plan view, illustrating a flat antifriction support for a high speed reciprocating table or tray, not shown. If lateral guides are needed for such a table or tray, they could also be provided with one or more suitably located air inlet nozzles and associated distributing grooves.

In the modification shown in FIG. 5, the housing 45 is provided with a bore 51, 52, 53 corresponding to the bore 21, 22, 23 of FIG. 3, which contains the thimble 56 with beveled nose 57 and axial bore 58. The metering disc 25, O-ring 33 and spring 34 may be the same as described above, but the solid plug 35 is here replaced by a plug 60 which is traversed by an axial bore 61, adapted for connection to a source of air under high presure, not shown. One or more such fittings and nozzle assemblies may be used, with individual air supplies, in situations where it is not feasible or convenient to supply air through a "manifold" conduit such as the groove 17 or the like.

The particular flat wafer-like form of the metering disc disclosed herein has proved to be very economical in requiring only a small amount of expensive material. Being separate from other elements of the assembly, it can be removed for replacement by merely unscrewing the retaining plug 35 or 60. Such discs can be mass produced with a high degree of uniformity and any "rejects" involve minimal loss of materials.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What we claim is:

1. An inlet nozzle assembly for an air bearing adapted to supply air under pressure to the gap between facing surfaces of relatively movable first and second machine elements, one of said elements being provided with a bore terminating at said surface of said element, said bore having a reduced diameter portion adjacent said surface and an annular seat adjacent said reduced diameter bore portion, the nozzle assembly comprising, a thin metering disc of a durable material traversed by an axially extending air-metering orifice, the disc having a centrally located reduced diameter portion adapted to rest in the reduced diameter portion of the bore, an O-ring resting against a peripheral portion of the disc on its side opposite the reduced diameter portion, a tubular thimble element fitting freely in said bore and having one end resting against the O-ring, a spring resting against an opposite end of the thimble element, a retaining element removably engaged in said bore in a position to compress the spring against said opposite end of the thimble, whereby the thimble compresses the O-ring against the disc and holds the disc against the annular seat, the means for supplying air under pressure to the nozzle assembly.

2. An inlet nozzle assembly according to claim 1 wherein the wall of the tubular element is traversed by at least one radial passage for transmission of the air under pressure.

3. An inlet nozzle assembly according to claim 1 wherein the retaining element is a plug traversed by an axial bore adapted for connection to the air supply means.

4. An inlet nozzle assembly according to claim 1 wherein the metering disc is of a material selected from nylon and synthetic ruby.

5. An inlet nozzle assembly according to claim 1 wherein the metering disc has one flat face and one stepped face, the centrally located reduced diameter portion being bounded by a narrow radially outwardly facing annular wall.

* * * * *